US011080817B2

(12) United States Patent
Ayush et al.

(10) Patent No.: US 11,080,817 B2
(45) Date of Patent: Aug. 3, 2021

(54) CLOTH WARPING USING MULTI-SCALE PATCH ADVERSARIAL LOSS

(71) Applicant: Adobe Inc., San Jose, CA (US)

(72) Inventors: Kumar Ayush, Santa Clara, CA (US); Surgan Jandial, Jammu (IN); Mayur Hemani, Noida (IN); Balaji Krishnamurthy, Noida (IN); Ayush Chopra, Pitampura (IN)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 16/673,574

(22) Filed: Nov. 4, 2019

(65) Prior Publication Data

US 2021/0133919 A1   May 6, 2021

(51) Int. Cl.
  *G06T 3/00*   (2006.01)
  *G06T 11/60*   (2006.01)
  *G06T 7/40*   (2017.01)

(52) U.S. Cl.
  CPC ............ *G06T 3/0093* (2013.01); *G06T 7/40* (2013.01); *G06T 11/60* (2013.01); *G06T 2207/20081* (2013.01); *G06T 2207/30196* (2013.01); *G06T 2210/16* (2013.01)

(58) Field of Classification Search
  CPC ......... G06T 3/0093; G06T 11/60; G06T 7/40; G06T 2207/20081; G06T 2210/16; G06T 2207/30196
  See application file for complete search history.

(56) References Cited

U.S. PATENT DOCUMENTS

2015/0269759 A1* 9/2015 Sekine ............... G06T 11/00
                                                              345/632

OTHER PUBLICATIONS

Dong, H., Liang, X., Shen, X., Wang, B., Lai, H., Zhu, J., . . . & Yin, J. (2019). Towards multi-pose guided virtual try-on network. In Proceedings of the IEEE International Conference on Computer Vision (pp. 9026-9035). (Year: 2019).*
Barratt,"A Note on the Inception Score", Jun. 21, 2018, 9 pages.
Gupta,"A Modified PSNR Metric based on HVS for Quality Assessment of Color Images", Dec. 2011, 5 pages.
Han,"VITON: An Image-based Virtual Try-on Network", Jun. 12, 2018, 19 pages.
Heusel,"GANs Trained by a Two Time-Scale Update Rule Converge to a Local Nash Equilibrium", Jan. 12, 2018, 12 pages.
(Continued)

*Primary Examiner* — Grace Q Li
(74) *Attorney, Agent, or Firm* — FIG. 1 Patents

(57) ABSTRACT

Generating a synthesized image of a person wearing clothing is described. A two-dimensional reference image depicting a person wearing an article of clothing and a two-dimensional image of target clothing in which the person is to be depicted as wearing are received. To generate the synthesized image, a warped image of the target clothing is generated via a geometric matching module, which implements a machine learning model trained to recognize similarities between warped and non-warped clothing images using multi-scale patch adversarial loss. The multi-scale patch adversarial loss is determined by sampling patches of different sizes from corresponding locations of warped and non-warped clothing images. The synthesized image is generated on a per-person basis, such that the target clothing fits the particular body shape, pose, and unique characteristics of the person.

20 Claims, 9 Drawing Sheets

(56) References Cited

OTHER PUBLICATIONS

Salimans, "Improved Techniques for Training GANs", In Advances in Neural Information Processing Systems, Jun. 10, 2016, 10 pages.
Wang, "Image Quality Assessment: From Error Visibility to Structural Similarity", Apr. 2004, 14 pages.
Wang, "Multiscale structural similarity for image quality assessment", Dec. 2003, 6 pages.
Wang, "Toward Characteristic-Preserving Image-based Virtual Try-On Network", Sep. 12, 2018, 16 pages.

* cited by examiner

CLOTH WARPING USING MULTI-SCALE PATCH ADVERSARIAL LOSS

With advances in computing device technology, online shopping has become an increasingly preferred mechanism for consumers compared to conventional approaches of visiting brick-and-mortar retail locations. However, despite the convenience offered by online shopping platforms, consumers are unable to perceive how a particular fashion item represented by a product image will actually appear when worn by the consumer. To provide consumers with a preview of how the fashion item will appear, conventional virtual fitting rooms estimate a consumer's body shape using a three-dimensional model. Such conventional three-dimensional models may be generated using various different approaches, such as using depth-sensing cameras, estimating a consumer's three-dimensional body shape using two-dimensional images, and so forth. While these approaches enable simulations of fashion items as being worn by a consumer, such conventional approaches are associated with high costs of hardware and computational resources required to collect and annotate three-dimensional image data.

To mitigate these problems, some conventional approaches consider two-dimensional, red-green-blue (RGB) images without leveraging any three-dimensional data. These conventional approaches aim to generate a new image that overlays a product image onto a corresponding region of an image of a consumer. However, such image overlay approaches are unable to accurately represent important aspects of the consumer image, such as a body pose of the consumer, and important aspects of the product image, such as product material-appropriate deformations, visual patterns of the product, and so forth. As a result, conventional approaches that consider only two-dimensional information often output images of a product overlaid on a consumer that fails to represent a realistic appearance of how the product will appear when actually worn by the consumer. Consequently, online shopping consumers are provided with fashion item previews that fail to accurately represent a real-world appearance of the fashion item as worn by individual consumers.

SUMMARY

Generating a synthesized image of a person wearing clothing is described. An image-based virtual try-on (IBVTON) system receives a two-dimensional reference image depicting a person wearing an article of clothing. The IBVTON system further receives a two-dimensional image of target clothing in which the person is to be dressed, which may be representative of a fashion item being considered for purchase by a consumer in an online marketplace. In order to generate the synthesized image of the person wearing the target clothing, the IBVTON system generates a warped image of the target clothing using a geometric matching module. The geometric matching module implements a machine learning model that is trained to recognize similarities and differences between warped and non-warped images of a same article of clothing using multi-scale patch adversarial loss determined by sampling patches of multiple sizes from corresponding same locations of the warped and non-warped images of the same article of clothing. The geometric matching module generates the warped image of the target clothing based on the reference image depicting the person, such that the target clothing is warped to fit the particular body pose and characteristics of the person.

To compute the multi-scale patch adversarial loss considered by the geometric matching module in generating the warped version of the target clothing, the IBVTON system considers various image pairs that each include a reference image of a person wearing an article of clothing and a product image that depicts the article of clothing without being worn by the person. The IBVTON system is further configured to derive a clothing-agnostic person representation of the person, which describes a pose of the person, a body shape of the person, and one or more reserved regions that correspond to the person's individual identity, such as hair and face regions. The IBVTON system generates a warped cloth by mapping the product image to the clothing-agnostic person representation and generates a ground truth warped cloth by extracting a mask of the article of clothing from the reference image. Patch pairs of multiple scales are sampled from corresponding same regions of both the generated warped cloth and ground truth warped cloth from regions that fall entirely within a cloth region of the warped cloth and ground truth warped cloth (e.g., from regions that do not include an edge of the warped cloth or ground truth warped cloth). The multi-scale patch adversarial loss is finally computed via a comparison of each of the pairs of patches and determination of whether the patch from the warped cloth shares a same local texture with the patch from the ground truth warped cloth.

The IBVTON system trains the geometric matching module using the patch pairs by providing pairs of patches from the same corresponding regions that share a same local texture as positive training examples and providing pairs of patches from different regions, or that do not share local textures, as negative training examples. The IBVTON system then implements a try-on module that is configured to generate a synthesized image depicting the person wearing the warped target clothing instead of clothing worn by the person in the reference image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
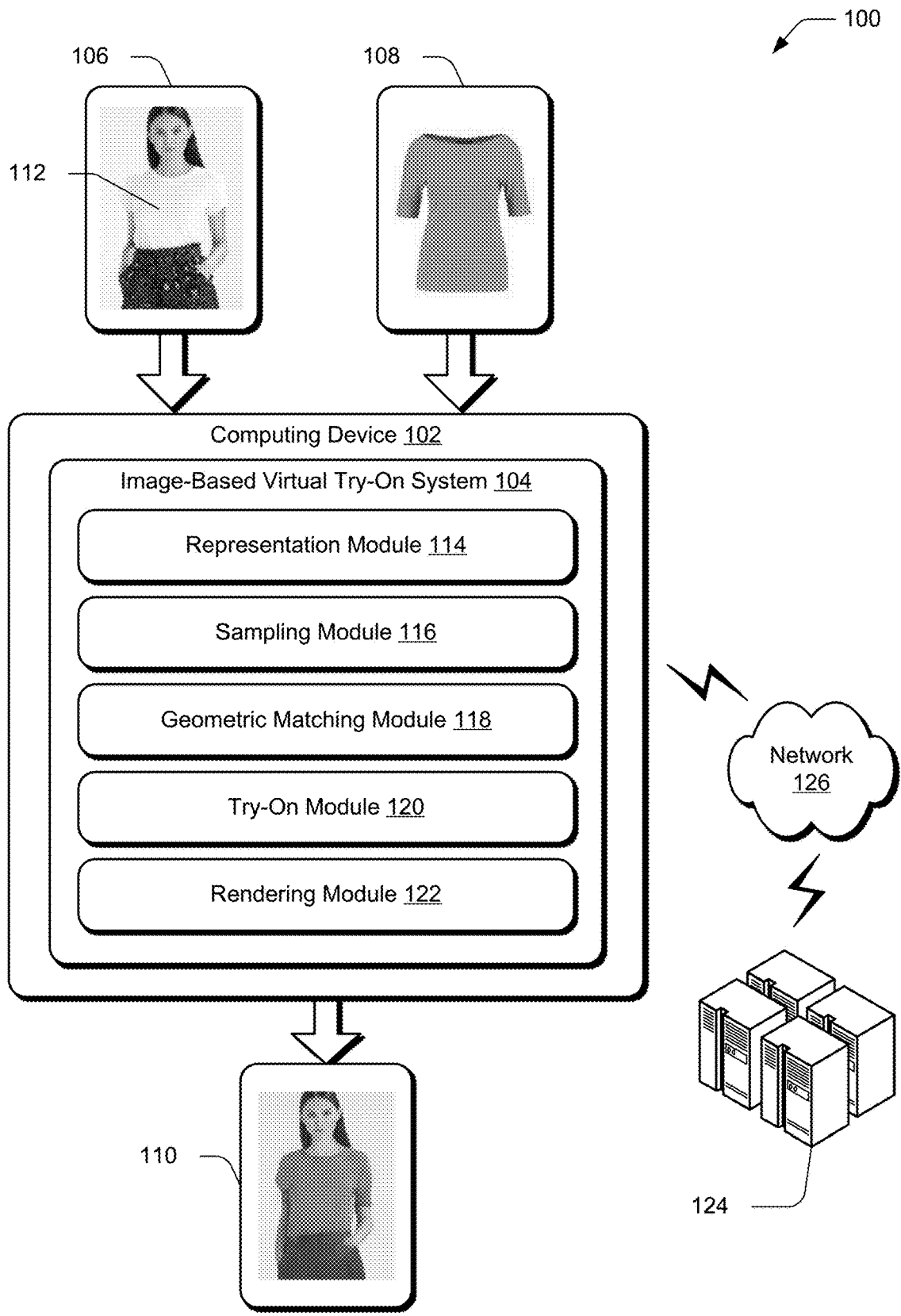
FIG. 1 is an illustration of an environment in an example implementation that is operable to employ the cloth warping techniques described herein.

With advances in computing device technology, online marketplaces and e-commerce platforms have become a preferred shopping mechanism over physically visiting brick-and-mortar retail locations. One drawback of shopping via online marketplaces and e-commerce platforms is the lack of a physical environment otherwise offered at a brick-and-mortar retail location, such as a physical dressing room in which shoppers can try on articles of clothing to preview how the clothing will fit before making a purchase decision. To address this drawback, conventional approaches enable users to preview how an article of clothing will appear using computer-generated graphics. These conventional approaches enable users to experience themselves wearing different clothes without requiring the users to physically wear the clothing. To do so, conventional try-on systems use computer graphics to build three-dimensional models of a user as well as clothing to be worn by the user, using geometric transformations and physical constraints derived from the three-dimensional models. However, these conventional try-on systems require manual input and significant amounts of computational and network resources to both collect information required to build the three-dimensional models and build the models.

To mitigate an amount of computational and network resources otherwise required by these conventional virtual try-on systems, some conventional systems formulate the approach to generating a preview image of a user wearing target clothing as a conditional image generation problem. In such a conditional image generation approach, given two images, one of a person and the other of target clothing, a new image is synthesized with the goal of retaining the original body shape and pose of the person while maintaining characteristics of the clothing product, such as texture, logo, text, and so forth. Some conventional approaches deform target clothing to align with the person image using conditional image generation techniques, such as image-to-image translation. To account for blurriness and other artifacts that result from these conditional image generation techniques, various approaches account for pixel-to-pixel losses (e.g., L1 and L2 losses), perceptual loss, and adversarial loss. However, these conventional approaches still render synthesized images with noticeable blurriness and fail to adequately retain characteristics of the target clothing. Furthermore, these conventional approaches are limited to generating synthesized images when the person image and the target clothing are roughly aligned as a prior to synthesis. Such conventional approaches are thus unable to deal with large-scale transformations or on-demand transformations required to provide a user with a real-time preview of how target clothing will appear.

Accordingly, cloth warping using multi-scale patch adversarial loss is described. An IBVTON system receives a reference image depicting a person wearing clothing and an image of target clothing in which the person depicted in the reference image is to be dressed. In order to generate a synthesized image of the person depicted in the reference image wearing the target clothing instead of the clothing originally depicted in the reference image, the IBVTON system generates a cloth-agnostic person representation of the person depicted in the reference image and uses the cloth-agnostic person representation as a model for generating a warped version of the target clothing in a manner that preserves visual characteristics of both the target clothing and the person depicted in the reference image. The warped version of the target clothing is deformed using a learnable thin-plate spline transformation that is output by a convolutional neural network to align the target clothing with the attributes described by the clothing-agnostic person representation. Parameters for the convolutional neural network are trained from paired images of target clothing and a person wearing the target clothing, without requiring an indication of explicit corresponding interest points in the images of the target clothing and the person wearing the target clothing.

The convolutional neural network is described herein in the context of a geometric matching module, which takes the clothing-agnostic person representation and image of target clothing as inputs, and generates a pose-coherent warped version of the target clothing as well as a composition mask that indicates details of the target clothing to be retained in the synthesized image. The composition mask enables output of a smooth synthesized image and accommodates transformations for different body shapes and body poses, such that the synthesized image output by the IBVTON system retains a personal identity of the person depicted in the reference image.

The geometric matching module is configured to output realistic synthesized images by undergoing training using multi-scale patch adversarial loss, which preserves clothing texture details to better model fine-grained intricacies in target clothing images. The multi-scale patch adversarial loss is determined by sampling pairs of patches of multiple scales from same corresponding locations of images of a warped cloth and a corresponding ground truth warped cloth. The ground truth warped cloth for an item of clothing may refer to an image of a model wearing the item of clothing, which thus provides a real-world baseline for how an appearance of the item of clothing should visibly appear when clothing a person, accounting for the person's body shape and body pose.

From these sampled patches, local loss can be determined to indicate whether a pair of patches represent a same local region and have a same local texture in both the predicted warped cloth and the ground truth warped cloth. The multi-scale patch adversarial loss is used together with pixel-to-pixel loss to generate a warped image of the target clothing, which is subsequently useable by a try-on module of the IBVTON system to output a synthesized image that depicts the person wearing the warped target clothing instead of the clothing depicted in the original reference image. In this manner, the techniques described herein generate synthesized images that do not suffer from the visual warping and bleeding artifacts otherwise generated by conventional approaches, while reducing an amount of network and computational resources required to do so.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 9.

The computing device 102 is illustrated as including an IBVTON system 104. The IBVTON system 104 represents functionality of the computing device 102 to receive a reference image 106 of a person and an image of target clothing 108 and generate a synthesized image 110 that depicts the person in the reference image 106 wearing the target clothing 108 instead of clothing 112 worn by the person in the reference image 106. The synthesized image 110 is generated by warping the target clothing 108 in a manner that accounts for the body shape and pose of the person in the reference image 106, while maintaining unique personal characteristics such as hair and face regions of the person in the reference image 106.

To generate the synthesized image 110, the IBVTON system 104 employs a representation module 114, a sampling module 116, a geometric matching module 118, a try-on module 120, and a rendering module 122. The representation module 114, the sampling module 116, the geometric matching module 118, the try-on module 120, and the rendering module 122 are each implemented at least partially in hardware of the computing device 102 (e.g., through use of a processing system and computer-readable storage media), as described in further detail below with respect to FIG. 9.

Given the reference image 106, the representation module 114 is configured to generate a cloth-agnostic person representation of the person depicted in the reference image 106. The cloth-agnostic person representation includes information describing a body shape, a body pose, certain regions (e.g., face and hair regions) that describe an appearance of the person in the reference image 106 independent of the clothing 112, as described in further detail below with respect to FIG. 3. The representation module 114 is further configured to generate a warped cloth and a ground truth warped cloth for an article of clothing that are useable by the IBVTON system 104 to train the geometric matching module 118, as described in further detail below with respect to FIGS. 4-6.

The sampling module 116 is configured to receive the warped cloth and the ground truth warped cloth from the representation module 114 and sample pairs of patches from corresponding same location of the warped cloth and the ground truth warped cloth. Each pair of patches is sampled at a same size from a location of the respective warped cloth and ground truth warped cloth that falls entirely within a cloth region, such that the sample does not include any portion of the warped cloth or ground truth warped cloth that represents an edge of a cloth or other image artifact not depicting cloth. The sampling module 116 randomly samples patch pairs of multiple different sizes from the warped cloth and ground truth warped cloth, which are used by the IBVTON system 104 to train the geometric matching module 118 using both multi-scale patch adversarial loss and least absolute deviations, or L1, loss, as described in further detail below with respect to FIG. 5. The multi-scale patch adversarial loss refers to a local loss that determines whether a patch from the warped cloth and a patch from the ground truth warped cloth represent the same local region and share a same texture.

Being trained with the multi-scale patch adversarial loss, the geometric matching module 118 is representative of functionality to generate a warped version of the target clothing 108 based on the clothing-agnostic person representation of the person depicted in the reference image 106. By training the geometric matching module 118 with multi-scale patch adversarial loss, the IBVTON system 104 is able to generate the warped version of the target clothing 108 via elastic transformation to fit the body shape and pose of the person depicted in the reference image 106 while maintaining texture details of the target clothing 108, such as material properties, logos, embroidery, and so forth. In this manner, the warped version of the target clothing 108 generated by the geometric matching module represents a rough alignment of the warped version of the target clothing 108 as aligned with a body shape and pose of the person depicted in the reference image 106.

The geometric matching module 118 then communicates the warped target clothing to the try-on module 120, which is representative of functionality to generate an image of a person wearing the warped target clothing. To do so, the try-on module 120 generates a concatenated input of the clothing-agnostic person representation and the warped clothing to render, as an output, an image of the person wearing the warped clothing and a composition mask representing a mask of the warped clothing derived from the output image of the person wearing the warped clothing, without the person. Using the composition mask, the try-on module 120 fuses together the warped clothing and the image of the person wearing the warped clothing to improve alignment and eliminate blurriness from the resulting image of the person wearing the warped target clothing. In this manner, the try-on module 120 avoids the unnatural appearances of synthesized images generated from conventional approaches that either directly paste warped clothing onto a target person image or generate the synthesized image using a single forward pass through an encoder-decoder network. To ensure the realistic appearance of a resulting synthesized image of the person wearing target clothing, the IBVTON system 104 is configured to train the try-on module 120 using both perceptual loss and least absolute deviations, or L1, loss, as described in further detail below with respect to FIG. 6.

The rendering module 122 is representative of functionality to output a display of information considered and generated by the IBVTON system 104, such as the reference image 106, the image of the target clothing 108, and the synthesized image 110. The rendering module 122 is further configured to generate and output a user interface for the IBVTON system 104, which may include controls to generate the synthesized image 110 given a reference image 106 and an image of the target clothing 108 and display the information considered and generated by the IBVTON system 104.

The reference image 106, the image of the target clothing 108, the synthesized image 110, and other information processed or generated by the IBVTON system 104 may be stored in storage of the computing device 102, as described in further detail below with respect to FIG. 9. Alternatively or additionally, the IBVTON system 104 is configured to provide the reference image 106, the image of the target clothing 108, the synthesized image 110, and additional information described in further detail below with respect to FIGS. 2-8 to a remote storage location for subsequent retrieval and/or access by the computing device 102 or different computing devices. For instance, the IBVTON system 104 may communicate information to remote storage 124, or directly to a different computing device, via network 126.

Having considered an example digital medium environment, consider now a discussion of an example system useable to generate synthesized image of a person wearing target clothing in accordance with aspects of the disclosure herein.

Figure 2:
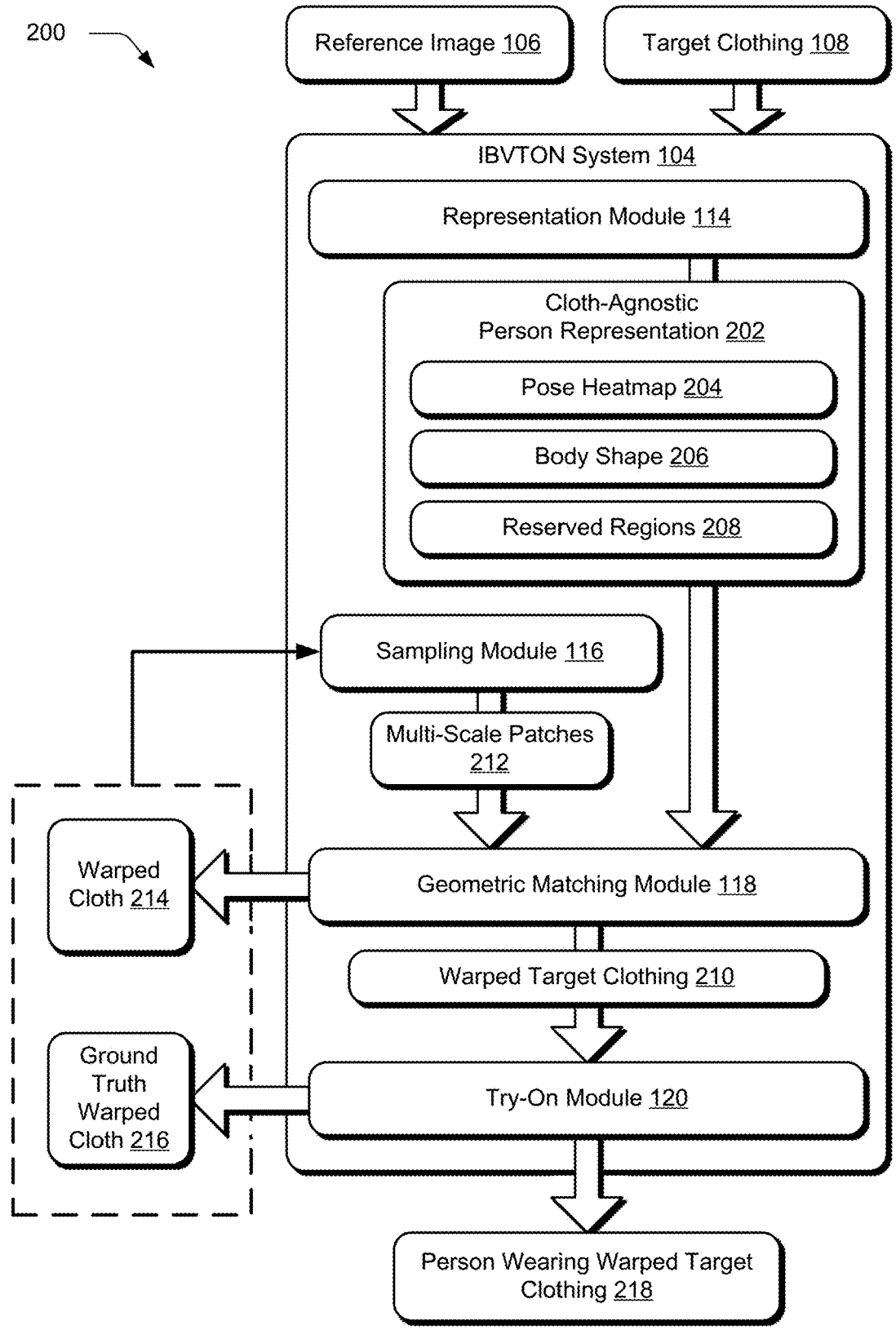
FIG. 2 illustrates an example implementation in which an image-based virtual try-on system of FIG. 1 generates a synthesized image of a person wearing warped clothing using techniques described herein.

FIG. 2 illustrates an example system 200 useable to generate a synthesized image depicting a person wearing warped target clothing, given a two-dimensional image of the person wearing different clothing and a two-dimensional image of the target clothing, in accordance with the techniques described herein. In the illustrated example, system 200 includes modules of the IBVTON system 104 as introduced with respect to FIG. 1, such as the representation module 114, the sampling module 116, the geometric matching module 118, and the try-on module 120. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 9.

In the example system 200, the IBVTON system 104 receives the reference image 106. In accordance with one or more implementations, the reference image 106 is received together with an indication of target clothing in which the person depicted in the reference image 106 is to be dressed, such as target clothing 108. Alternatively or additionally, the IBVTON system 104 may receive an indication of the target clothing subsequent to receiving the reference image 106. The reference image 106 is representative of a two-dimensional image that depicts a person and optionally depicts the person wearing one or more articles of clothing. The target clothing 108 is also a two-dimensional image, which depicts at least one article of target clothing without being worn by a person, such as a preview image for an article of clothing isolated from any other image objects or artifacts provided by an online marketplace.

Upon receiving the reference image 106, the representation module 114 is configured to generate a cloth-agnostic person representation 202 for the person depicted in the reference image 106. The cloth-agnostic person representation 202 is representative of information used by the IBVTON system 104 to deform target clothing in order to generate an image of the person wearing warped target clothing 218, such as synthesized image 110 illustrated in FIG. 1. Specifically, the cloth-agnostic person representation 202 includes a pose heatmap 204, a body shape 206, and one or more reserved regions 208 for a person depicted in the reference image 106, which collectively represent a set of features used as a prior to constrain the IBVTON system 104's process of generating the synthesized image 110.

Figure 3:
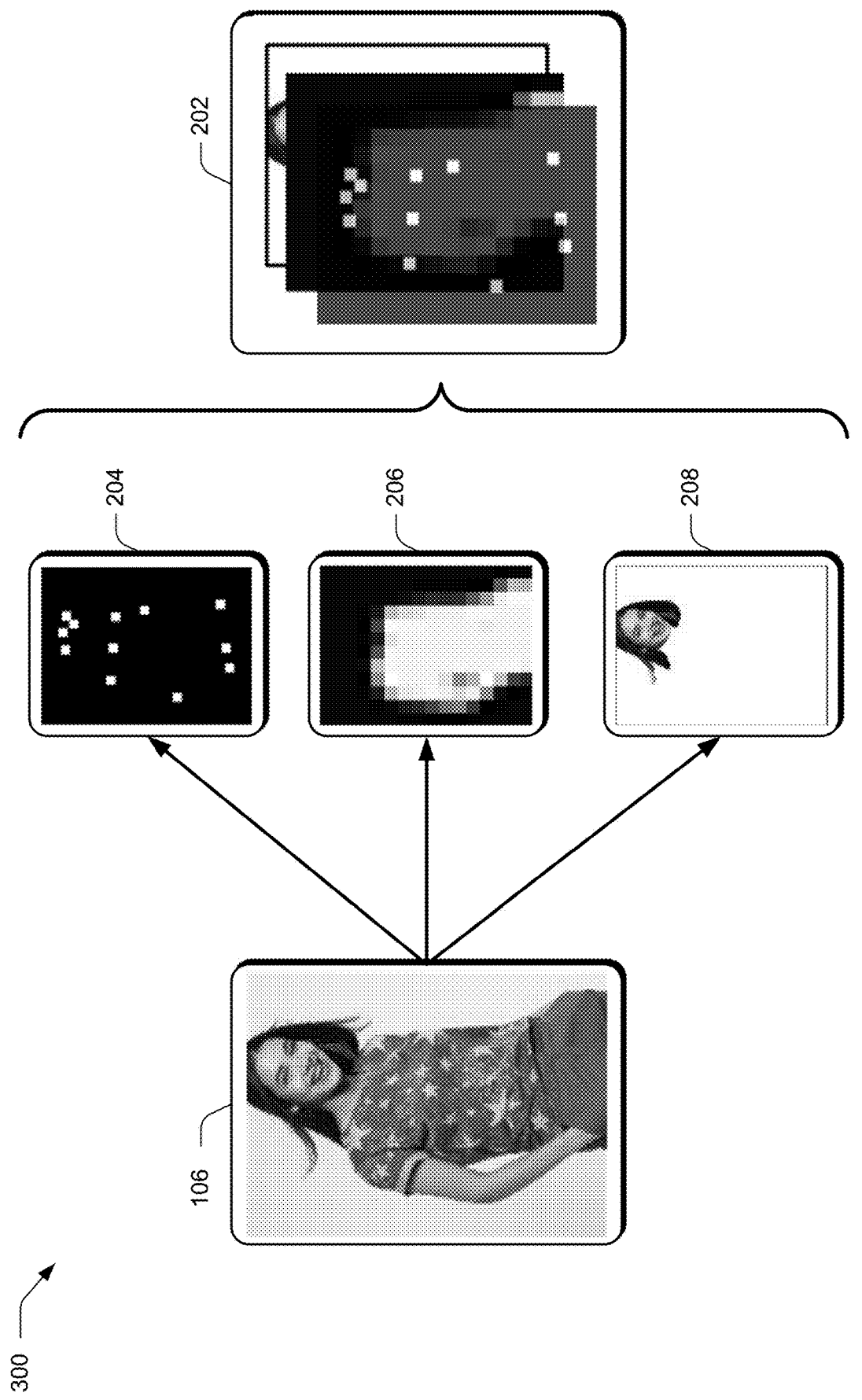
FIG. 3 illustrates an example implementation of a clothing-agnostic person representation generated by the image-based virtual try-on system of FIG. 1.

FIG. 3 illustrates an example implementation 300 of a cloth-agnostic person representation 202 generated from a reference image 106 by the representation module 114. The cloth-agnostic person representation 202 is representative of information used by the IBVTON system 104 to deform target clothing in order to generate an image of the person wearing warped target clothing 218, such as synthesized image 110 illustrated in FIG. 1. Specifically, the cloth-agnostic person representation 202 includes a pose heatmap 204, a body shape 206, and one or more reserved regions 208 for a person depicted in the reference image 106, which collectively represent a set of features used as a prior to constrain the IBVTON system 104's process of generating the synthesized image 110.

The pose heatmap 204 is representative of information that describes a body pose of the person depicted in the reference image 106, which consequently affects a deformation of the target clothing to be represented in the image of the person wearing warped target clothing 218. In some implementations, the representation module 114 generates the pose heatmap 204 using a known pose estimator, such as the pose estimator described in Z. Cao, T. Simon, S.-E. Wei, and Y. Sheikh, Realtime Multiperson 2D Pose Estimation Using Part Affinity Fields (CVPR, 2017). The pose heatmap 204 may comprise coordinates representing a number of keypoints that in turn represent the pose of the person depicted in reference image 106. In some implementations, the representation module 114 generates the pose heatmap 204 using 18 keypoints. To leverage their spatial layout, each keypoint is transformed to a heatmap with an h×h pixel neighborhood surrounding the keypoint, where h represents any suitable number of pixels, such as 11×11 pixels, filled in elsewhere with ones and zeros. Each heatmap generated from the keypoints is further stacked into an x-channel pose heatmap, which is output by the representation module 114 as pose heatmap 204, where x corresponds to a number of keypoints used by the representation module 114 in generating the pose heatmap 204.

The body shape 206 is representative of information that describes various regions (e.g., arms, legs, torso, etc.) of a body of the person depicted in reference image 106. In order to generate the body shape 206, the representation module 114 is configured to implement a human parser to compute a human segmentation map, where different regions represent different corresponding body parts. In some implementations, the representation module 114 implements a human parser, using known techniques. The representation module 114 then converts the segmentation map derived using the human parser to a single channel binary mask, where "ones" in the binary mask indicate human body regions (except for face and hair) and "zeroes" in the binary mask represent regions of the reference image 106 that do not depict human body parts. The representation module 114 then downsamples the binary mask to a lower resolution, which assists in avoiding artifacts that otherwise might occur when portions of a human body as indicated by the body shape 206 and the target clothing conflict. This downsampled binary mask is then output by the representation module 114 as the body shape 206.

The reserved regions 208 are representative of information describing physical attributes of the person depicted in the reference image 106, such as face attributes, skin attributes, hair attributes, and the like, which enable the IBVTON system 104 to maintain an identity of the person depicted in the reference image 106 when generating the synthesized image 110. In order to generate the reserved regions 208, the representation module 114 implements a human parser, such as the human parser that was implemented to derive the body shape 206. Using the human parser, the representation module 114 extracts red, green, blue (RGB) channels of face, skin, and hair regions of the person depicted in the reference image 106 in the form of feature maps to be preserved in generating the image of the person wearing warped target clothing 218.

Each of the pose heatmap 204, the body shape 206, and the one or more reserved regions 208 are feature maps useable to describe an appearance of the person depicted in the reference image 106, independent of any clothing being worn by the person depicted in the reference image 106, such as clothing 112 illustrated in FIG. 1. The representation module 114 sizes the feature maps represented by the pose heatmap 204, the body shape 206, and the one or more reserved regions 208 to a common resolution and concatenates the feature maps to form the cloth-agnostic person representation 202. Mathematically, the cloth-agnostic person representation can be represented according to Equation 1, where p represents the cloth-agnostic person representation, m represents a height of the concatenated feature maps, n represents a width of the concatenated feature maps, and k represents a number of channels for the feature maps.

$$p \in \mathcal{R}^{m \times n \times k} \quad (\text{Eq.1})$$

The cloth-agnostic person representation 202 is then useable by the geometric matching module 118 to generate a warped image of target clothing in a manner that preserves the body shape and pose of a person depicted in the reference image 106.

Returning to FIG. 2, the representation module 114 communicates the cloth-agnostic person representation 202 to the geometric matching module 118 together with the target clothing 108. The geometric matching module 118 is configured to generate warped target clothing 210, which a represents a result of warping the target cloth 108 to conform to the cloth-agnostic person representation 202. In order for the geometric matching module 118 to output visually realistic warped target clothing 210, the IBVTON system 104 is configured to train the geometric matching module 118 using multi-scale patch adversarial loss, which is computed using multi-scale patches 212 generated by the sampling module 116. The multi-scale patches 212 are representative of a collection of different patch pairs, where each patch pair includes one patch sampled from a region of a warped cloth 214 and another patch sampled from a corresponding same region of the ground truth warped cloth 216.

In accordance with one or more implementations, the warped cloth 214 is representative of an instance of warped target clothing 210 generated by the geometric matching module 118, such that information output by the geometric matching module 118 can subsequently be used by the IBVTON system 104 to further train the geometric matching module. In accordance with one or more implementations, the ground truth warped cloth 216 is representative of a ground truth representation of the person wearing warped target clothing 218 generated by the try-on module 120, as described in further detail below. In this manner, information output by the try-on module 120 is useable by the IBVTON system 104 to further train the geometric matching module. The IBVTON system 104 is configured to train the geometric matching module 118 using multi-scale patches 212 sampled from different pairs of a warped cloth 214 and a ground truth warped cloth 216. Thus, to initially train the geometric matching module 118, the IBVTON system 104 receives different pairs of a warped cloth 214 and a ground truth warped cloth 216 from a remote location, such as from a different computing device via network 126, as illustrated in FIG. 1.

For each pair of a warped cloth 214 and a ground truth warped cloth 216, the sampling module 116 pseudo-randomly extracts patch pairs of varying sizes from corresponding same locations of the respective warped cloth 214 and ground truth warped cloth 216. Each of the multi-scale patches 212 are sampled from a region of the warped cloth 214 or ground truth warped cloth 216 that includes only cloth (e.g., does not include an edge of the depicted cloth or a portion that includes other artifacts not corresponding to cloth, such as portions of a person otherwise represented in the ground truth warped cloth, background portions of an image, and so forth). The multi-scale patches 212 are then used by the IBVTON system 104 to train the geometric matching module 118 with multi-scale patch adversarial loss to generate the warped target clothing 210, as described in further detail below with respect to FIGS. 4-6.

The trained geometric matching module 118 is thus configured to generate the warped target clothing 210, given the cloth-agnostic person representation 202 and the target clothing 108, and communicate the warped target clothing 210 to the try-on module 120. Although the warped target clothing 210 is roughly aligned with the body shape 206 of the person depicted in the reference image 106, the try-on module 120 represents functionality of the IBVTON system 104 to fuse the warped target clothing 210 together with the cloth-agnostic person representation 202 to output a synthesized image, such as an image of a person wearing warped target clothing 218. Given the concatenated input of the cloth-agnostic person representation 202 and the warped target clothing 210, the try-on module 120 simultaneously renders a person image and predicts a composition mask and fuses together the rendered person image with the warped target clothing 210 using the composition mask to output the person wearing warped target clothing 218. As described in further detail below with respect to FIG. 6, the IBVTON system 104 is configured to train the try-on module 120 to minimize a discrepancy between the image of the person wearing warped target clothing 218 and the ground truth warped cloth 216 corresponding to the warped target clothing 210.

Having considered an example system useable to generate synthesized image of a person wearing target clothing, consider now example implementations of generating a synthesized image of a person wearing target clothing in accordance with aspects of the disclosure herein.

Figure 4:
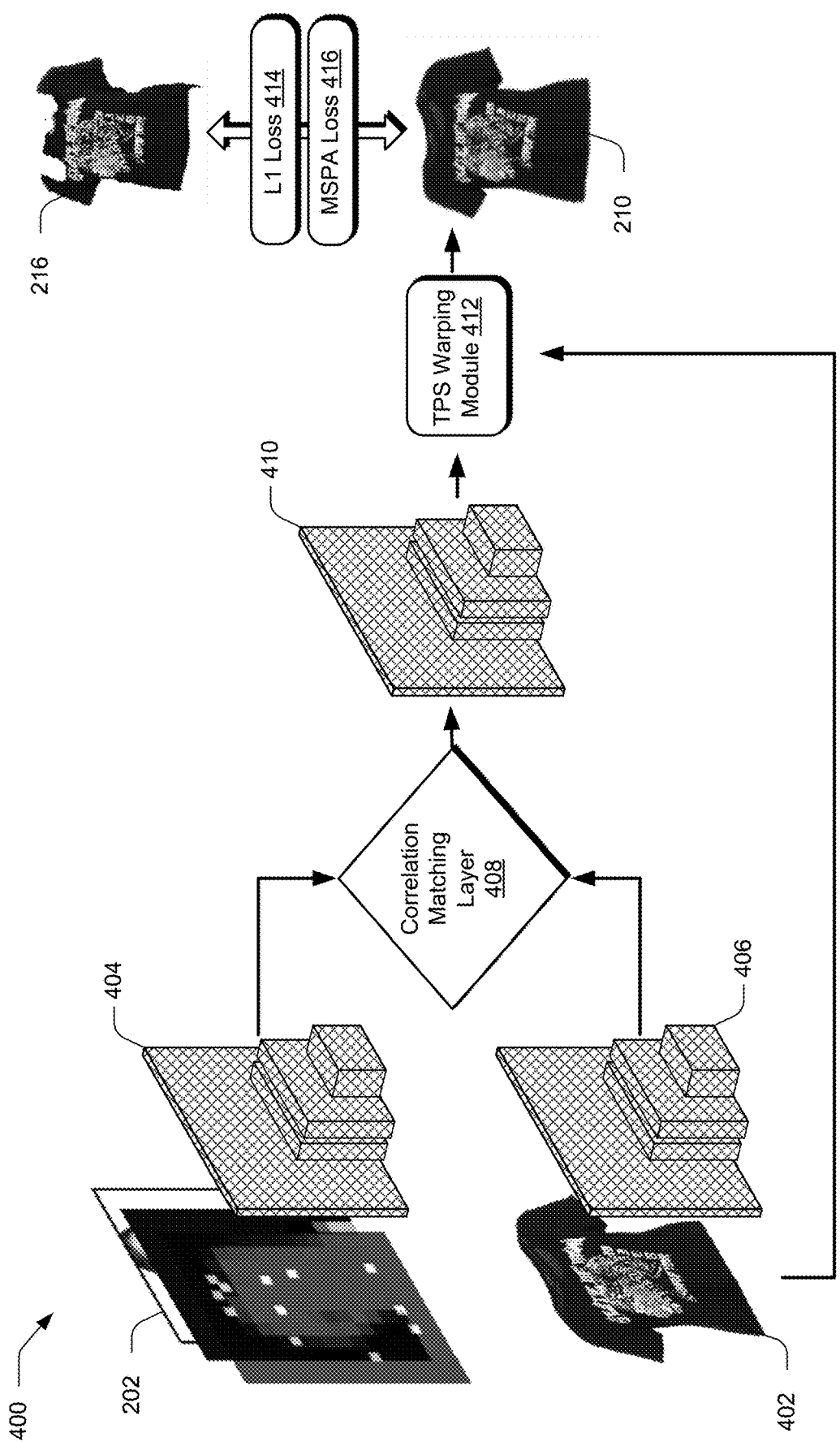
FIG. 4 illustrates an example implementation of a geometric matching module of the image-based virtual try-on system of FIG. 1.

FIG. 4 illustrates an example implementation 400 of the geometric matching module 118 of the IBVTON system 104 of FIG. 1 generating warped target clothing 210 in accordance with the techniques described herein. To generate the warped target clothing 210, the geometric matching module 118 receives a cloth-agnostic person representation 202 and a two-dimensional image of target clothing 402 in which the person represented by the cloth-agnostic person representation 202 is to be dressed. In this manner, the target clothing 402 is representative of an instance of the target clothing 108 illustrated in FIG. 1.

Geometric matching module 118 includes two convolutional neural networks 404 and 406 that are configured to extract features from the respective cloth-agnostic person representation 202 and target clothing 402. Specifically, convolutional neural networks 404 and 406 represent functionality to receive an input image (e.g., cloth-agnostic person representation 202 or target clothing 402) and output a feature map that describes high-level features of the received input image. Mathematically, the feature map output by each of convolutional neural networks 404 and 406 can be represented as set forth in Equation 2, where h×w represents a dense spatial grid of d-dimensional local descriptors for the respective input image:

$$f \in \mathbb{R}^{h \times w \times d} \quad \text{(Eq. 2)}$$

In some implementations, the convolutional neural networks 404 and 406 are each representative of a pre-trained VGG-16 convolutional neural network. In this manner, the convolutional neural networks 404 and 406 are arranged in a Siamese configuration, such that the input cloth-agnostic person representation 202 and target clothing 402 are passed through two identical networks that share parameters. The image features produced by the convolutional neural networks 404 and 406 are then passed to the correlation matching layer 408, which is representative of functionality to combine the features output by the convolutional neural networks 404 and 406 into a single tensor for input to the regression network 410.

In generating the single tensor, the correlation matching layer 408 initially identifies all pairs of similarities between descriptors output by the convolutional neural networks 404 and 406. The correlation matching layer 408 then computes similarity scores from the pairs of similarities and normalizes the similarity scores, such that ambiguous matches are strongly down-weighted. Stated mathematically, in an example implementation where the outputs of the convolutional neural networks 404 and 406 are L2-normalized dense feature maps $f_A, f_B \in \mathbb{R}^{h \times w \times d}$ a correlation map output by the correlation layer can be represented as $c_{AB} \in \mathbb{R}^{h \times w \times (h \times w)}$, which contains at each position the scalar product of a pair of individual descriptors $f_A \in f_a$ and $f_B \in f_b$, as described in Equation 3.

$$c_{AB}(i,j,k) = f_B(i,j)^T (f_A(i_k, j_k)) \quad \text{(Eq. 3)}$$

In Equation 3, (i,j) and $(i_k, j_k)$ indicate individual feature positions in the h×w dense feature maps, and $k = h(j_k - 1) + i_k$ represents an auxiliary indexing variable for $(i_k, j_k)$. To remove ambiguous matches from the pairwise similarity scores, the geometric matching module 118 applies a channel-wise normalization of the correlation map at each spatial location to produce the final tentative correspondence map $f_{AB}$. This channel-wise normalization initially zeroes out negative correlations, and is followed by L2-normalization.

The single tensor output by the correlation matching layer 408 is then communicated to regression network 410. Regression network 410 is representative of functionality of the geometric matching module 118 to estimate spatial transformation parameters for the cloth-agnostic person representation 202 and the target clothing 402 in generating the warped target clothing 210. In some implementations, these spatial transformation parameters are estimated from the list of tentative correspondences included in the single tensor output by the correlation matching layer 408. Spatial transformation parameters are estimated beginning with a neural network with two stacked blocks of convolutional layers, followed by batch normalization and the rectified linear unit (ReLU) non-linearity, and finishing using a fully-connected layer, which regresses to the spatial transformation parameters. In this manner, the regression network 410 is configured to estimate spatial transformations for both the cloth-agnostic person representation 202 and the target clothing 402 using a convolutional regression network. Alternatively or additionally, the regression network 410 may be configured to use fully connected layers.

The regression network 410 then passes the spatial transformation parameters to a Thin Plate Spine (TPS) warping module 412 of the geometric matching module 118. The TPS warping module 412 uses the spatial parameters to warp the two-dimensional image of the target clothing 402 and output the warped target clothing 210. The TPS warping module 412 first estimates an affine transformation for generating the warped target clothing 210. In some implementations, the affine transformation represents an n-degree of freedom linear transform that is capable of modeling translation, rotation, non-isotropic scaling and shear, where n represents any suitable integer (e.g., 6).

The estimated affine transformation is then used by the TPS warping module 412 to align image the cloth-agnostic person representation 202 and the target clothing 402 using known techniques, such as via an image resampling layer. The aligned images of the cloth-agnostic person representation 202 and the target clothing 402 are then passed by the TPS warping module 412 through a second geometry estimation network configured to estimate the 18 parameters of a thin-plate spline transformation. The TPS warping module 412 finally outputs an estimate of the geometric transformation required to warp the target clothing 402 into the warped target clothing 210 by composing the two transformations into a thin-plate spline.

Mathematically, the output of the warped target clothing 210 can be represented as described in Equation 4, where c represents the target clothing, ĉ represents the warped target clothing 210, θ represents the spatial transformation parameters output by the regression network 410, and T represents the thin-plate spline output by the TPS warping module 412.

$$\hat{c} = T_\theta(c) \quad \text{(Eq. 4)}$$

In order to improve the quality of warped target clothing 210 output by the geometric matching module 118, the IBVTON system 104 is configured to train the pipeline of the geometric matching module 118 in an end-to-end manner using L1 loss 414. The L1 loss 414 represents a pixel-wise loss between the warped target clothing 210 and the ground truth for the warped target clothing 210, such as ground truth warped cloth 216, as in FIG. 2. Mathematically, L1 loss 414 may be described as set forth in Equation 5, where p represents the cloth-agnostic person representation and $c_t$ represents the ground truth warped cloth 216.

In addition to training the geometric matching model 118 using pixel-wise L1 loss, the IBVTON system 104 is configured to train the geometric matching model 118 in a supervised learning environment using multi-scale patch adversarial (MSPA) loss 416 which is determined based on the multi-scale patches 212 generated by the sampling module 116, as described in further detail below with respect to FIG. 6.

Figure 5:
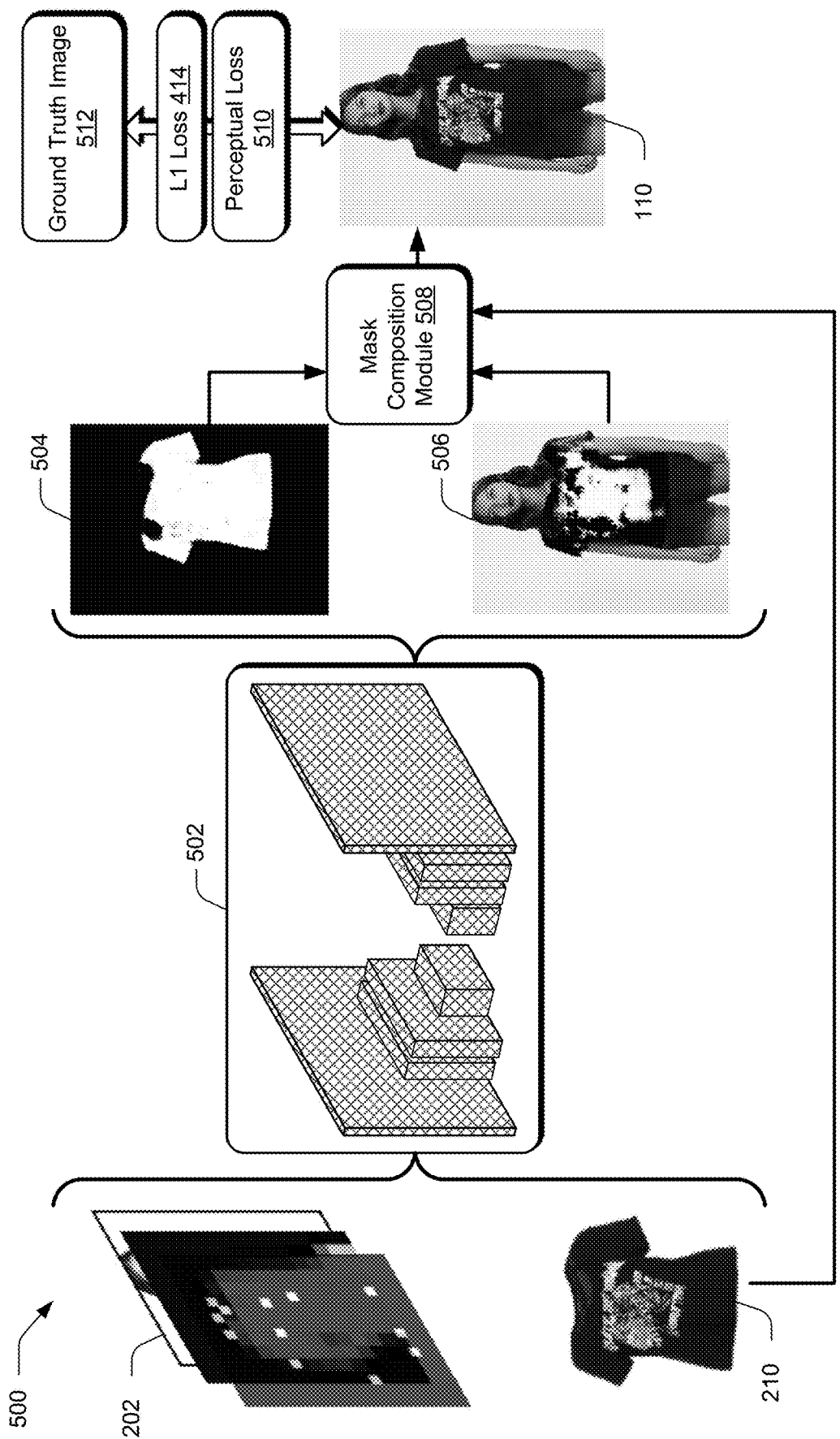
FIG. 5 illustrates an example implementation of a try-on module of the image-based virtual try-on system of FIG. 1.

FIG. 5 illustrates an example implementation 500 of the try-on module 120 of the IBVTON system 104 of FIG. 1 generating a synthesized image depicting a person wearing warped target clothing 218 in accordance with the techniques described herein. To generate the synthesized image of the person wearing warped target clothing 218, the try-on module 120 receives the cloth-agnostic person representation 202 generated by the representation module 114 and the warped target clothing 210 generated by the geometric matching module 118.

The try-on module 120 passes the concatenated input of the cloth-agnostic person representation 202 and the warped target clothing 210 to an encoder-decoder network 502 and outputs a predicted composition mask 504 as well as a person image 506. As described herein, the composition mask 504 represents a segmentation mask of the warped target clothing 210, which can be contrasted against the person representation 202 that encodes all surrounding context for the person to be dressed in the warped target clothing 210, other than the warped target clothing 210 itself.

In some implementations, the encoder-decoder network 502 may be implemented as a convolutional neural network, such as implemented using the UNet framework architecture. In such an implementation, the encoder-decoder network includes a contracting path and an expansive path. The contracting path follows the architecture of a convolutional network, and represents functionality to repeatedly apply multiple convolutions that are each followed by a rectified linear unit (ReLU) and downsampling to increase a number of feature channels included in an output feature map. The expansive path of the encoder-decoder network 502 represents an upsampling of the feature map output by the contracting path, followed by performing up-convolutions to reduce the number of feature channels and crop the feature map to account for loss. A final layer of the encoder-decoder network 502 may be used to map feature resulting feature vectors to a desired number of image class labels (e.g., classification labels assigned to each pixel of the predicted composition mask 504 and the person image 506.

The composition mask 504 is useable by the try-on module 120 to generate the synthesized image 110, which includes the person image 506 and the warped target clothing 210 fused together as a synthesized final result, representative of the person wearing warped target clothing 218, as described with respect to FIG. 2. Mathematically, the synthesized image 110 that includes the person wearing warped target clothing 218 can be represented as $I_O$ in Equation 5, where $I_r$ represents the person image 506, M represents the composition mask 504, and $\odot$ represents element-wise matrix multiplication.

$$I_O = M \odot \hat{c} + (1-M) \odot I_r \quad \text{(Eq. 5)}$$

In order to train the try-on module 120, the IBVTON system 104 is configured to use both L1 loss 414 and perceptual loss 510 to minimize a discrepancy between the synthesized image 110 and the ground truth image 512. In some implementations, perceptual loss 510 may be defined as $L_{VGG}$ in Equation 6.

$$L_{VGG}(I_O, I_t) = \sum_{i=1}^{5} \lambda_i \|\phi_i(I_O) - \phi_i(I_t)\|_1 \quad \text{(Eq. 6)}$$

In Equation 6, $\phi_i(I)$ denotes the feature map of an image I of the i-th layer in the visual perception network $\phi$, which may be configured as a deep convolutional network for large scale image recognition. In Equation 6, $I_t$ represents the ground truth image 512 for the synthesized image 110, represented by $I_O$. Layers of the convolutional network i≥1 are representative of 'conv1_2', 'conv2_2', 'conv3_2', 'conv4_2', and 'conv5_2', respectively. Each convolutional layer is used to learn a feature representation that encodes content information of an input image. This encoded representation is useable by the IBVTON system 104 to better understand an image to be warped in generating a warped cloth. In order to preserve as much characteristics of target clothing as possible, the composition mask M is biased to select warped clothing by applying an L1 regularization $\|1-M\|_1$ on M. The resulting loss function for the try-on module 120 is represented as $L_{TOM}$ in Equation 7.

$$L_{TOM} = \lambda_{L1} \|I_O - I_t\|_1 + \lambda_{VGG} L_{VGG}(\hat{I}, I) + \lambda_{mask} \|1-M\|_1 \quad \text{(Eq. 7)}$$

Having considered a try-on module useable to generate a synthesized image for a person depicted in a reference image and a piece of target clothing, consider now a determination of multi-scale patch adversarial loss for training the geometric matching module in accordance with the techniques described herein.

Figure 6:
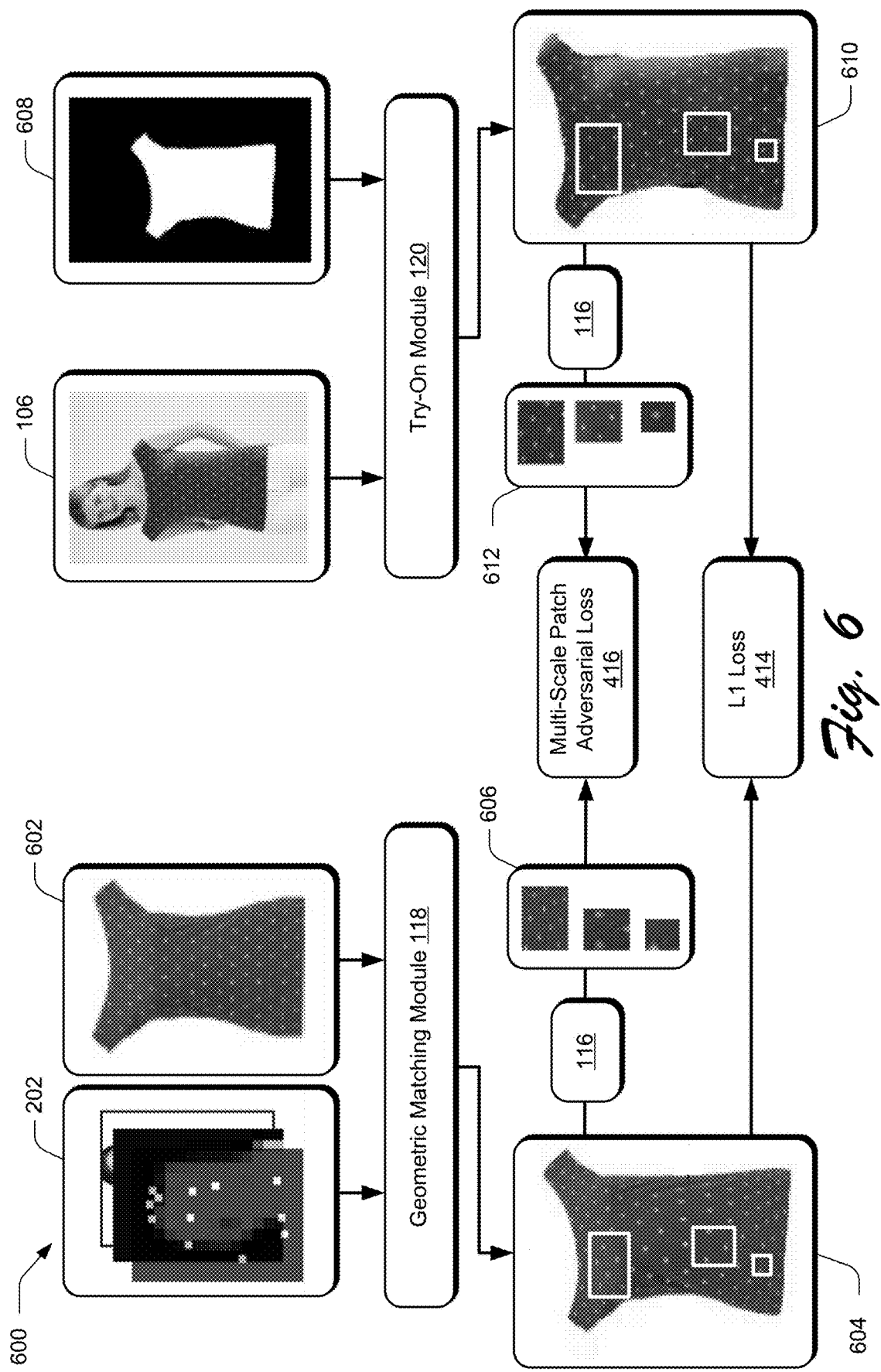
FIG. 6 illustrates an example implementation of training the geometric matching module of the image-based virtual try-on system of FIG. 1 using multi-scale patch adversarial loss.

FIG. 6 illustrates an example implementation 600 of the IBVTON system 104 determining multi-scale patch adversarial loss for training the geometric matching module 118 in accordance with the techniques described herein. In the illustrated example, the geometric matching module 118 receives as input the person representation 202 and an in-shop cloth 602 and outputs a warped cloth 604 for the in-shop cloth. The in-shop cloth 602 is representative of an image of clothing 112 worn by the person in the reference image 106 as displayed independent of being worn by the person.

Given the cloth-agnostic person representation 202 and the in-shop cloth 602 as inputs, the geometric matching module 118 is configured to output the warped cloth 604 in a similar manner used to generate the image of the person wearing warped target clothing 218, as described with respect to FIG. 2. The sampling module 116 then uses the warped cloth 604 as an input to generate multi-scale patches 606 for use in determining the multi-scale patch adversarial loss 416.

As a corollary, the try-on module 120 receives the reference image 106 from which the cloth-agnostic person representation 202 was derived and a ground truth warped mask 608 for the warped cloth 604, such as a ground truth image generated by the try-on module 120 as described with respect to FIG. 5. The try-on module 120 generates a ground truth warped cloth 610 by processing the reference image 106 and the ground truth warped mask 608 using the mask composition module 508 of the try-on module 120. The sampling module 116 then uses the ground truth warped cloth 610 as an input to generate multi-scale patches 612 for use in determining multi-scale patch adversarial loss 416.

The sampling module 116 is configured to randomly sample multi-scale patches 606 and 612 from the respective warped cloth 604 and ground truth warped cloth 610 at same corresponding locations in regions that include only cloth portions of the warped cloth 604 or ground truth warped cloth 610. In order to determine the multi-scale patch adversarial loss 416, the sampling module 116 is configured as a local patch discriminator that recognizes a pair of cropped patches from the same corresponding regions of the warped cloth 604 and ground truth warped cloth 610 as a positive example and a pair of patches from different regions as a negative example. Represented mathematically, the multi-scale patch adversarial loss 416 is represented by $L_{ms-adv}$ in Equation 8.

$$L_{ms-adv} = -\sum_i \sum_j (D_{patch}(p_{1ij}, p_{2ij}) - 1)^2 \quad \text{(Eq. 8)}$$

In Equation 8, a positive example identified by sampling module 116 is represented as $(D_{patch}(.)=1)$ and a negative training example is represented as $(D_{patch}(.)=0)$. The multi-scale patches 606 and 612 can be represented as $p_{1i}$ ($\hat{w}c$, $s_i$) and $p_{2i}$ ($\hat{w}c$, $s_i$) of size $s_i \times s_i$, and j corresponds to a number of cropped patches of size $s_i \times s_i$. In this manner, the multi-scale patch adversarial loss 416 can be used by the IBVTON system 104 to train the geometric matching module 118 in outputting warped target clothing 210.

Having considered example details of generating a synthesized image of a person wearing warped target clothing, consider now some example procedures to illustrate aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6.

Figure 7:
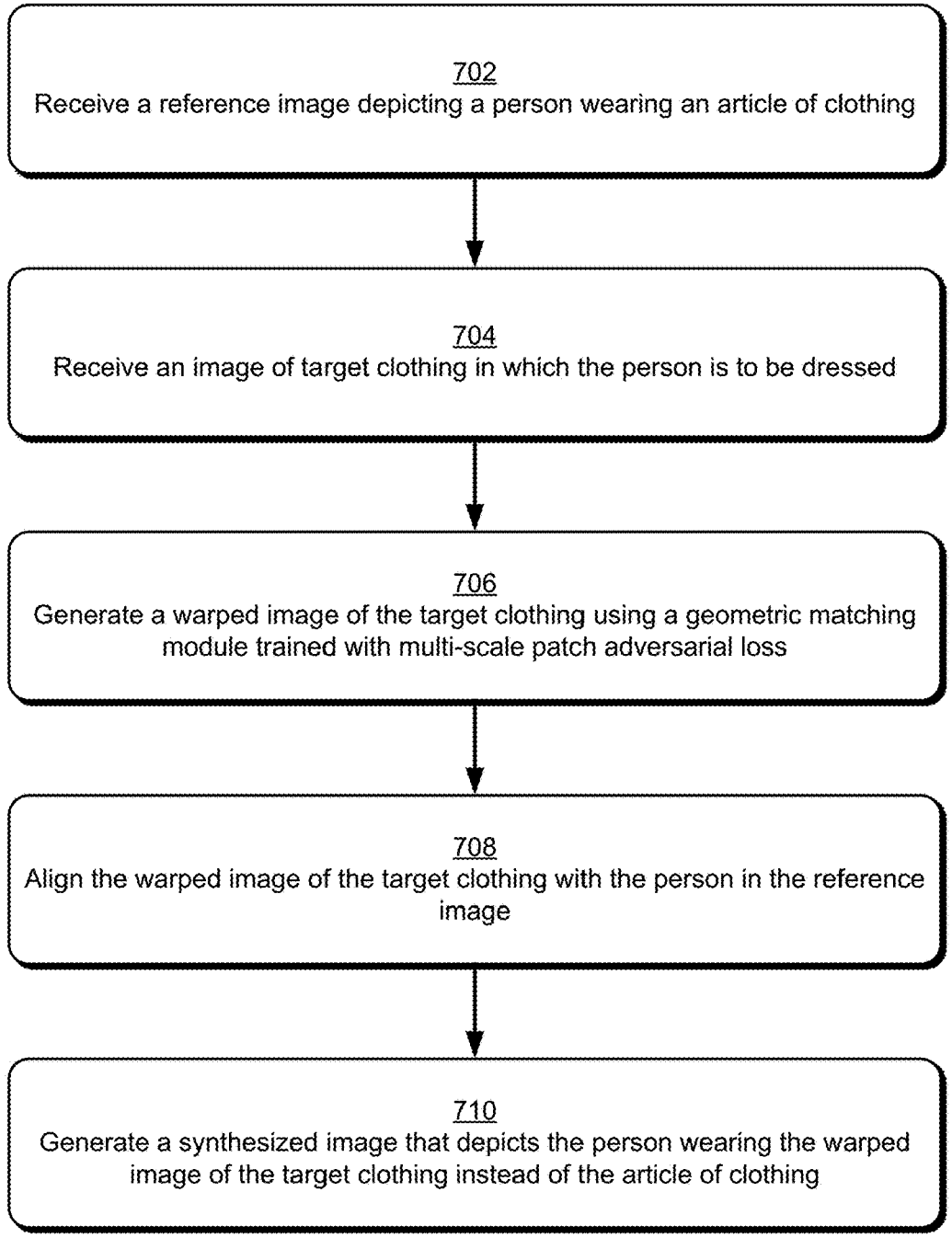
FIG. 7 is a flow diagram depicting a procedure in an example implementation for generating a synthesized image of a person wearing warped clothing using the techniques described herein.

FIG. 7 depicts a procedure 700 in an example implementation of generating a synthesized image that depicts a person wearing a warped image of target clothing using the techniques described herein. A reference image depicting a person wearing an article of clothing is received (block 702). The representation module 114 of the IBVTON system 104, for instance, receives the reference image 106 depicting a person wearing clothing 112. An image of target clothing in which the person is to be dressed is also received. The representation module 114, for instance, receives target clothing 108. Both the reference image 106 and the target clothing 108 are representative of two-dimensional images. In some implementations, the reference image 106 may be received from a user of the computing device implementing the IBVTON system 104 and the target clothing 108 may be received from an online marketplace.

A warped image of the target clothing is then generated using a geometric matching module trained with multi-scale patch adversarial loss (block 706). The geometric matching module 118 of the IBVTON system 104, for instance, obtains a cloth-agnostic person representation 202 for the person depicted in the reference image 106 and uses the cloth-agnostic person representation 202 to generate warped target clothing 210 by mapping the target clothing 108 to the cloth-agnostic person representation 202. In some implementations, the cloth-agnostic person representation 202 is generated by the representation module 114 and communicated to the geometric matching module 118. The geometric matching module 118 is configured to generate the warped target clothing 210 by being trained using multi-scale patch adversarial loss 416 as well as L1 loss 414 to configure a thin plate spline transformation for warping the target clothing 108 to conform with the cloth-agnostic person representation 202. The multi-scale patch adversarial loss 416 may be determined using multi-scale patches 214 generated by the sampling module 116 of the IBVTON system 104, such as illustrated by the flow of FIG. 8.

The warped image of the target clothing is then aligned with the person in the reference image (block 708). The try-on module 120 of the IBVTON system 104, for instance, aligns the warped target clothing 210 with the cloth-agnostic person representation 202 and outputs an image of a person wearing warped target clothing 218, which is representative of a synthesized image 110 output by the IBVTON system 104. To do so, the try-on module 120 generates a predicted composition mask 504 as well as a person image 506 by running the cloth-agnostic person representation 202 and the warped target clothing 210 through an encoder-decoder network. The try-on module 120 then implements a mask composition module 508 to generate the synthesized image by fusing the person image 506 together with the warped target clothing 210 using parameters specified by the composition mask 504. A synthesized image that depicts the person wearing the warped image of the target clothing instead of the article of clothing is then output (block 710). The rendering module 122 of the IBVTON system 104, for instance, outputs a display of the synthesized image 110, which depicts a person wearing warped target clothing 218.

Figure 8:
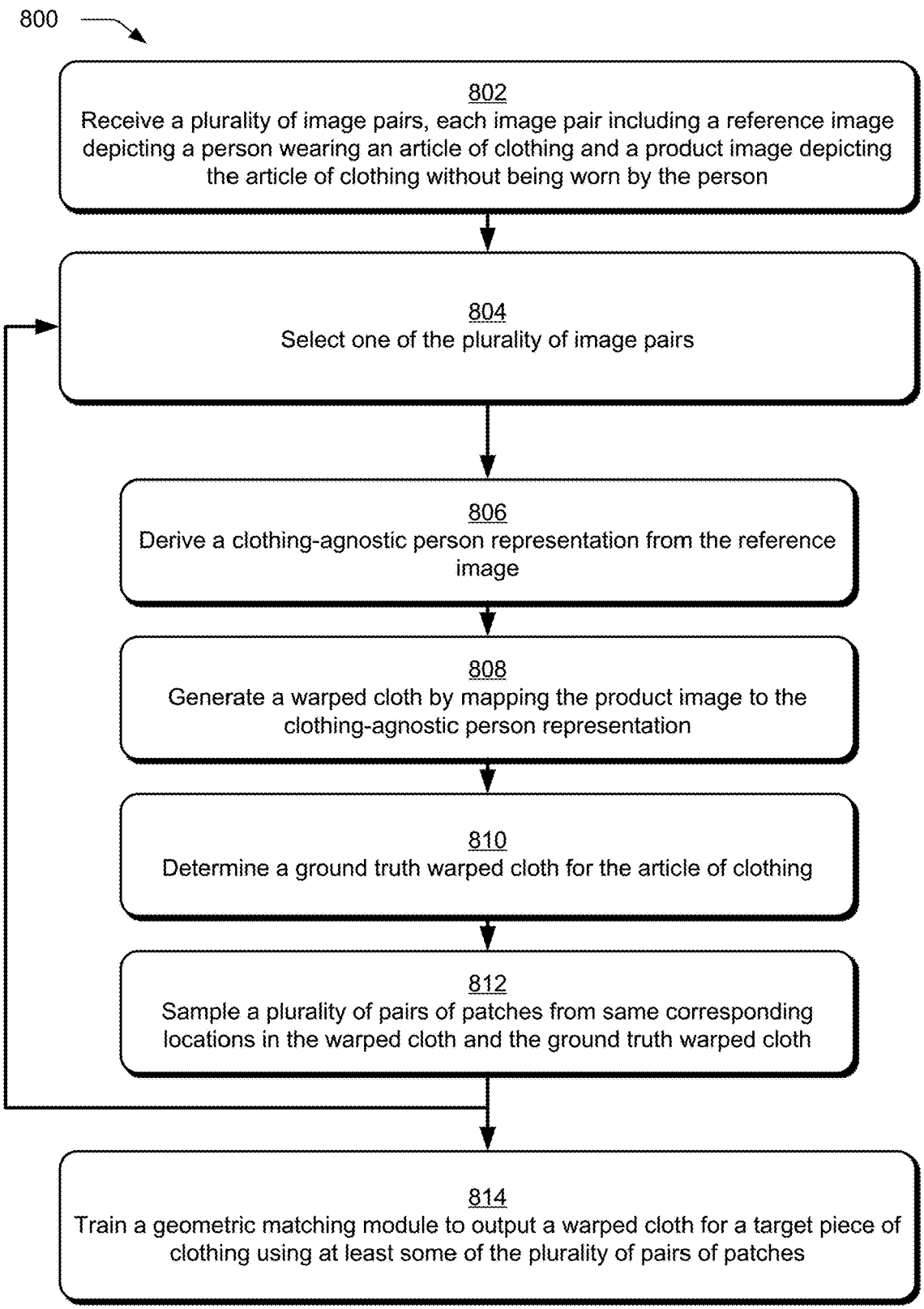
FIG. 8 is a flow diagram depicting a procedure in an example implementation for training a geometric matching module to generate a synthesized image with multi-scale patch adversarial loss using the techniques described herein.

FIG. 8 depicts a procedure 800 in an example implementation of training a geometric matching module to output a warped cloth for a target piece of clothing using multi-scale patch adversarial loss in accordance with the techniques described herein. A plurality of image pairs are received, with each image pair including a reference image depicting a person wearing an article of clothing and a product image depicting the article of clothing without being worn by the person (block 802). The representation module 114 of the IBVTON system 104, for instance, receives the reference image 106 depicting a person wearing clothing 112. An image of target clothing in which the person is to be dressed is also received. The representation module 114, for instance, receives target clothing 108. Both the reference image 106 and the target clothing 108 are representative of two-dimensional images. In some implementations, the reference image 106 may be received from a user of the computing device implementing the IBVTON system 104 and the target clothing 108 may be received from an online marketplace.

One of the image pairs is then selected (block 804). The representation module 114, for instance, selects an image pair comprising the reference image 106 and the target clothing 108. For the selected image pair, a clothing-agnostic person representation is derived from the reference image (block 806). The representation module 114, for instance, generates cloth-agnostic person representation 202, which includes pose heatmap 204 describing a body pose of the person depicted in the reference image 106, body shape 206 that defines a body shape of the person depicted in the reference image 106, and reserved regions 208, which correspond to face, hair, and skin regions of the person depicted in the reference image 106.

A warped cloth is then generated by mapping the product image to the clothing-agnostic person representation (block 808). The geometric matching module 118 of the IBVTON system 104, for instance, obtains a cloth-agnostic person representation 202 for the person depicted in the reference image 106 and uses the cloth-agnostic person representation 202 to generate warped target clothing 210 by mapping the target clothing 108 to the cloth-agnostic person representation 202. A ground truth warped cloth is then determined for the article of clothing (block 810). In some implementations, the ground truth warped cloth is provided to the IBVTON system 104 as one image from a pair of product images, such as an image of an isolated clothing item and an image of a model wearing the clothing item, where the image of the model wearing the clothing item represents the ground truth warped cloth for the image of the isolated clothing item.

A plurality of pairs of patches are then sampled from same corresponding locations in the warped cloth and the ground truth warped cloth (block 812). The sampling module 116 of the IBVTON system 104, for instance, generates multi-scale patches 606 from the warped cloth 604 and generates multi-scale patches 612 from the ground truth warped cloth 610. Each of the multi-scale patches 606 have a corresponding patch in the multi-scale patches 612, which represent samples of entirely cloth regions of the respective warped cloth 604 and ground truth warped cloth 610. Locations at which the sampling module 116 samples the multi-scale patches 212 are identified in a pseudo-random manner, and are compared to one another to determine whether the patches share a same local texture and consequently correspond to same regions of the sampled cloths. The IBVTON system 104 is configured to repeat this process of sampling multi-scale patches 202 for different ones of the plurality of image pairs, as indicated by the arrow returning to block 804.

Using the multi-scale patches, the geometric matching module is trained to output a warped cloth given a target piece of clothing using multi-scale patch adversarial loss calculated using at least some of the patches (block 814). The IBVTON system 104 trains the geometric matching module 118 using the multi-scale patches 212 by providing pairs of patches from the same corresponding regions that share a same local texture as positive training examples and providing pairs of patches from different regions, or that do not share local textures, as negative training examples. In addition to training the geometric matching module 118 using multi-scale patch adversarial loss 416, the IBVTON system 104 may train the geometric matching module 118 using L1 loss 414. In this manner, the geometric matching module 118 is trained to output visually realistic images of warped target clothing that roughly align with the cloth-agnostic person representation 202, for subsequent processing by the try-on module 120 to generate a synthesized image 110 depicting a person wearing warped target clothing 218.

Having described example procedures in accordance with one or more implementations, consider now an example system and device that can be utilized to implement the various techniques described herein.

Example System and Device

Figure 9:
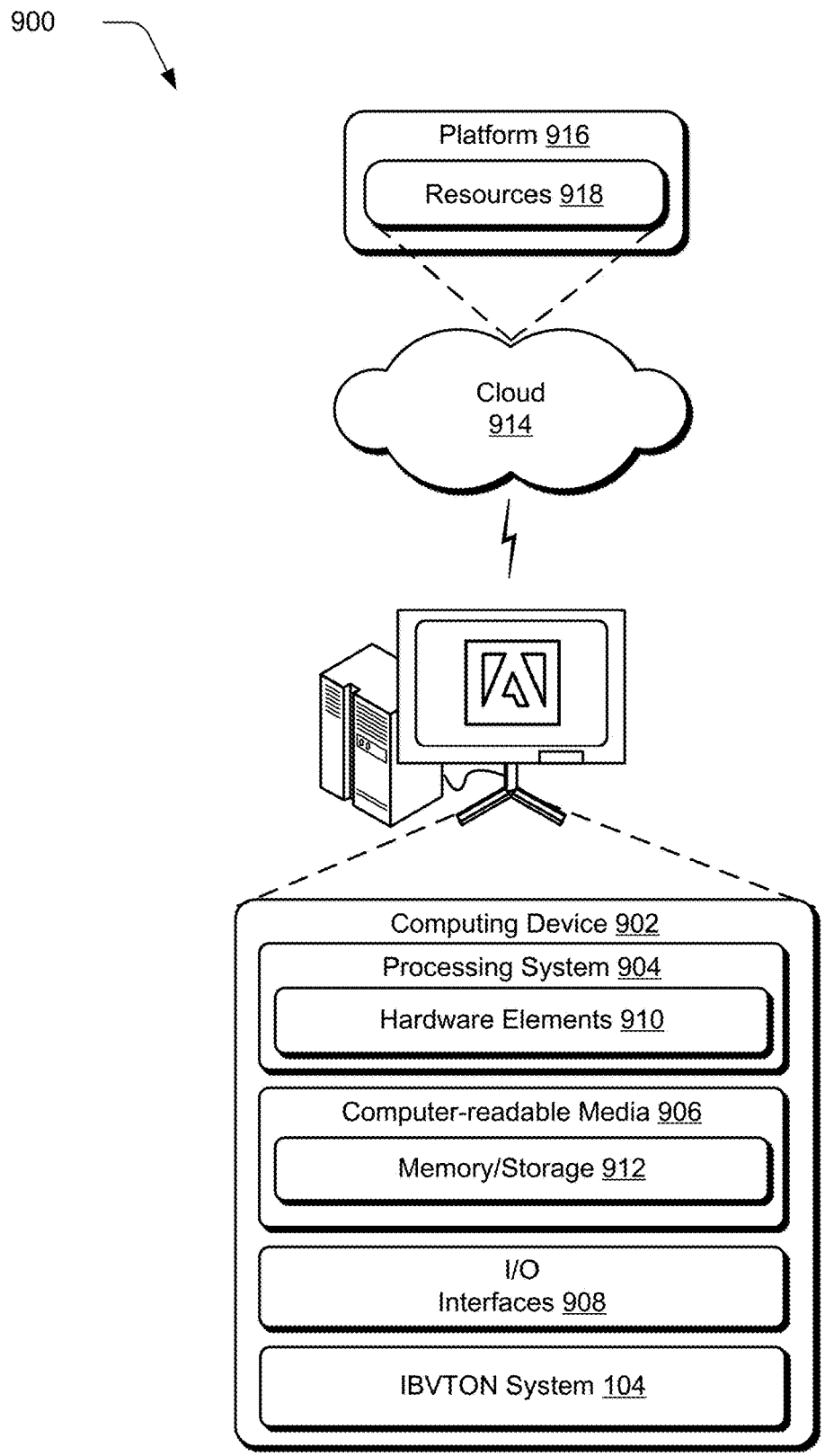
FIG. 9 illustrates an example system including various components of an example device that can be implemented as a computing device as described and/or utilized with reference to FIGS. 1-8 to implement the techniques described herein.

FIG. 9 illustrates an example system generally at 900 that includes an example computing device 902 that is representative of one or more computing systems and/or devices that may implement the various techniques described herein. This is illustrated through inclusion of the image-based virtual try-on (IBVTON) system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for generating a synthesized image of a person wearing target clothing, a method implemented by at least one computing device, the method comprising:
   receiving, by the at least one computing device, a reference image depicting a person wearing an article of clothing;
   receiving, by the at least one computing device, an image of target clothing in which the person is to be depicted as wearing;
   generating, by the at least one computing device, a warped image of the target clothing using a geometric matching module trained using multi-scale patch adversarial loss, the warped image of the target clothing being generated based on a person representation derived from the reference image and the multi-scale patch adversarial loss being computed using a plurality of pairs of patches sampled from corresponding locations in a mask of the article of clothing derived from the reference image and a product image depicting the article of clothing without being worn by a person; and
   generating, by the at least one computing device, a synthesized image that depicts the person wearing the warped image of the target clothing instead of the article of clothing.

2. The method as recited in claim 1, wherein the reference image and the image of target clothing are two dimensional images.

3. The method as recited in claim 1, wherein the person representation includes information describing a pose heatmap, a body shape, and one or more reserved regions that collectively represent the person wearing the article of clothing.

4. The method as recited in claim 3, wherein the pose heatmap is a multi-channel feature map with each channel corresponding to a human pose keypoint represented as a rectangle.

5. The method as recited in claim 3, wherein the body shape is a single-channel feature map of a binary mask representing a human body.

6. The method as recited in claim 3, wherein the one or more reserved regions are defined as an RGB (red-green-blue) image that contains one or more of a hair region or a face region for the person wearing the article of clothing to maintain an identity of the person.

7. The method as recited in claim 1, wherein the multi-scale patch adversarial loss is further computed by:

receiving an image pair that includes the reference image depicting the person wearing the article of clothing and the product image depicting the article of clothing without being worn by the person;

deriving a clothing-agnostic person representation from the reference image for the person depicted in the reference image wearing the article of clothing;

generating a warped cloth by mapping the product image to the clothing-agnostic person representation;

generating a ground truth warped cloth for the article of clothing by extracting the mask of the article of clothing from the reference image;

sampling the plurality of pairs of patches from the warped cloth and the ground truth warped cloth, each of the plurality of pairs of patches being sampled from a same corresponding location in the warped cloth and the ground truth cloth; and comparing each of the plurality of pairs of patches to determine whether the patch from the warped cloth and the patch from the ground truth warped cloth share a same local texture.

8. The method as recited in claim 7, wherein each patch of the plurality of pairs of patches are sampled from portions that fall within a cloth region of the respective warped cloth or ground truth warped cloth from which the patch was sampled.

9. The method as recited in claim 7, wherein the geometric matching module is further trained using a least absolute deviations loss that is computed based on the warped cloth and the ground truth warped cloth.

10. The method as recited in claim 7, wherein the plurality of pairs of patches from the warped cloth and the ground truth warped cloth include:

a first pair of patches of a first size;

a second pair of patches of a second size that is different from the first size; and a third pair of patches of a third size that is different from both the first size and the second size.

11. The method as recited in claim 1, further comprising aligning, by the at least one computing device, the warped image of the target clothing with the person in the reference image prior to generating the synthesized image.

12. In a digital medium environment for training a geometric matching module using multi-scale patch adversarial loss, a method implemented by at least one computing device, the method comprising:

receiving, by the at least one computing device, a plurality of image pairs, each image pair including a reference image that depicts a person wearing an article of clothing and a product image that depicts the article of clothing not being worn by a person;

for each of the plurality of image pairs:
 determining, by the at least one computing device, a clothing-agnostic person representation for the person wearing the article of clothing;
 generating, by the at least one computing device, a warped version of the article of clothing;
 determining, by the at least one computing device, a ground truth warped cloth for the article of clothing; and
 sampling, by the at least one computing device, a plurality of pairs of patches from the warped version of the article of clothing and the ground truth warped cloth; and training, by the at least one computing device, the geometric matching module to output a warped cloth for a target piece of clothing using multi-scale patch adversarial loss, the multi-scale patch adversarial loss determined by:
 providing a pair of patches from the plurality of pairs of patches sampled from same corresponding regions of a warped version of the article of clothing and the ground truth warped cloth as positive training examples; and
 providing a pair of patches from the plurality of pairs of patches sampled from different regions of the warped version of the article of clothing and the ground truth warped cloth as negative training examples.

13. The method as recited in claim 12, wherein determining the clothing-agnostic person representation of the person depicted in the reference image comprises receiving the clothing-agnostic person representation from a different computing device.

14. The method as recited in claim 12, wherein determining the clothing-agnostic person representation of the person depicted in the reference image comprises deriving the clothing-agnostic person representation of the person depicted in the reference image from the reference image.

15. The method as recited in claim 12, wherein generating the warped version of the article of clothing comprises mapping the product image to the clothing-agnostic person representation.

16. The method as recited in claim 12, wherein determining the ground truth warped cloth for the article of clothing comprises extracting a mask of the article of clothing from the reference image.

17. The method as recited in claim 12, wherein each of the plurality of patches is sampled from a same corresponding location of the warped version of the article of clothing and the ground truth warped cloth, the same corresponding location being sampled from portions that fall within cloth regions of the respective warped version of the article of clothing and the ground truth warped cloth.

18. The method as recited in claim 12, wherein the clothing-agnostic person representation includes information describing a pose heatmap, a body shape, and one or more reserved regions that collectively represent the person wearing the article of clothing.

19. The method as recited in claim 12, wherein the sampled plurality of pairs of patches include:

a first pair of patches of a first size;

a second pair of patches of a second size that is different from the first size; and a third pair of patches of a third size that is different from both the first size and the second size.

20. In a digital medium environment for generating a synthesized image of a person wearing target clothing, a system comprising:

one or more processors; and a computer-readable storage medium having instructions stored thereon that are executable by the one or more processors to perform operations comprising:
 receiving a plurality of image pairs, each image pair including a reference image that depicts a person wearing an article of clothing and a product image that depicts the article of clothing not being worn by a person;
 determining, for each of the plurality of image pairs, a clothing-agnostic person representation for the person wearing the article of clothing, a warped version of the article of clothing, and a ground truth warped cloth for the article of clothing;

determining multi-scale patch adversarial loss using the warped version of the article of clothing and the ground truth warped cloth from each of the plurality of image pairs by sampling a plurality of patches from the warped version of the article of clothing and the ground truth warped cloth;

training a geometric matching module to output a warped cloth for the target clothing using the multi-scale patch adversarial loss; and outputting the synthesized image of the person wearing the target clothing using the warped cloth generated by the geometric matching module responsive to receiving the target clothing.

\* \* \* \* \*